(12) United States Patent
Yang et al.

(10) Patent No.: US 11,956,045 B2
(45) Date of Patent: Apr. 9, 2024

(54) INTERFERENCE SUPPRESSION METHOD AND BASE STATION

(71) Applicant: Huawei Technologies Co., Ltd., Shenzhen (CN)

(72) Inventors: Yong Yang, Chengdu (CN); Weixin Wang, Shanghai (CN); Mingyang Sun, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 17/455,527

(22) Filed: Nov. 18, 2021

(65) Prior Publication Data
US 2022/0077912 A1 Mar. 10, 2022

Related U.S. Application Data

(63) Continuation of application No. PCT/CN2020/091755, filed on May 22, 2020.

(30) Foreign Application Priority Data

May 22, 2019 (CN) .......................... 201910429837.0

(51) Int. Cl.
*H04B 7/06* (2006.01)
*H04B 17/336* (2015.01)
(Continued)

(52) U.S. Cl.
CPC ......... *H04B 7/0626* (2013.01); *H04B 7/0617* (2013.01); *H04B 17/336* (2015.01); *H04L 5/0051* (2013.01); *H04W 16/28* (2013.01)

(58) Field of Classification Search
CPC ................ H04B 7/0626; H04B 7/0617; H04B 17/336; H04B 7/086; H04B 7/0408; H04B 7/043;
(Continued)

(56) References Cited

U.S. PATENT DOCUMENTS

2007/0142045 A1 6/2007 Senarath et al.
2018/0227029 A1 8/2018 Nammi et al.
(Continued)

FOREIGN PATENT DOCUMENTS

CN 103563477 A 2/2014
CN 104052700 A 9/2014
(Continued)

OTHER PUBLICATIONS

Huawei et al., "Benefits of cross-link interference mitigation", 3GPP TSG RAN WG1 Meeting #87, R1-1611225, Reno, NV, US, Nov. 14-18, 2016, 4 pages.
(Continued)

*Primary Examiner* — Kibrom T Hailu
(74) *Attorney, Agent, or Firm* — Slater Matsil, LLP

(57) ABSTRACT

A method includes: determining M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers; and if a ratio of M to N is greater than a third preset value, skipping scheduling and sending the N CSI beams included in the same-layer beams.

17 Claims, 5 Drawing Sheets

(51) Int. Cl.
*H04L 5/00* (2006.01)
*H04W 16/28* (2009.01)

(58) Field of Classification Search
CPC ... H04L 5/0051; H04L 5/0023; H04L 5/0048; H04L 5/0073; H04W 16/28; H04W 52/243; H04W 72/046; H04W 72/541; H04W 72/542; H04J 11/0073; H04J 11/0076; H04J 11/005
See application file for complete search history.

(56) References Cited

U.S. PATENT DOCUMENTS

| | | | |
|---|---|---|---|
| 2018/0262313 A1 | 9/2018 | Nam et al. | |
| 2020/0028745 A1* | 1/2020 | Parkvall | H04W 24/10 |

FOREIGN PATENT DOCUMENTS

| | | |
|---|---|---|
| CN | 105162500 A | 12/2015 |
| CN | 103703704 B | 2/2017 |
| CN | 108282212 A | 7/2018 |
| CN | 108712227 A | 10/2018 |
| CN | 108738042 A | 11/2018 |
| CN | 108809454 A | 11/2018 |
| CN | 108811102 A | 11/2018 |
| CN | 109391995 A | 2/2019 |
| WO | 2018223386 A1 | 12/2018 |

OTHER PUBLICATIONS

Haupt, R.L., "Element Selection for Partial Adaptive Nulling", 2010 IEEE Antennas and Propagation Society International Symposium, Jul. 11-17, 2010, pp. 1-4.

Samsung, "CLI management in NR IAB", 3GPP TSG RAN WG1 Meeting #94b, R1-1810866, Chengdu, China, Oct. 8-12, 2018, 4 pages.

Samsung, "Cross-link interference management based on coordinated beamforming", 3GPP TSG RAN WG1 Meeting NR#3, R1-1716036, Sep. 18-21, 2017, 12 Pages, Nagoya, Japan.

LG Electronics, "Discussion on CLI measurement for duplexing flexibility", 3GPP TSG RAN WG1 Meeting #89, R1-1707678, Hangzhou, P.R. China, May 15-19, 2017, 6 pages.

Sony, "Enhancements on multi-beam operation", 3GPP TSG RAN WG1 #96bis, R1-1904241, Xi'an, China, Apr. 3-12, 2019, 9 pages.

* cited by examiner

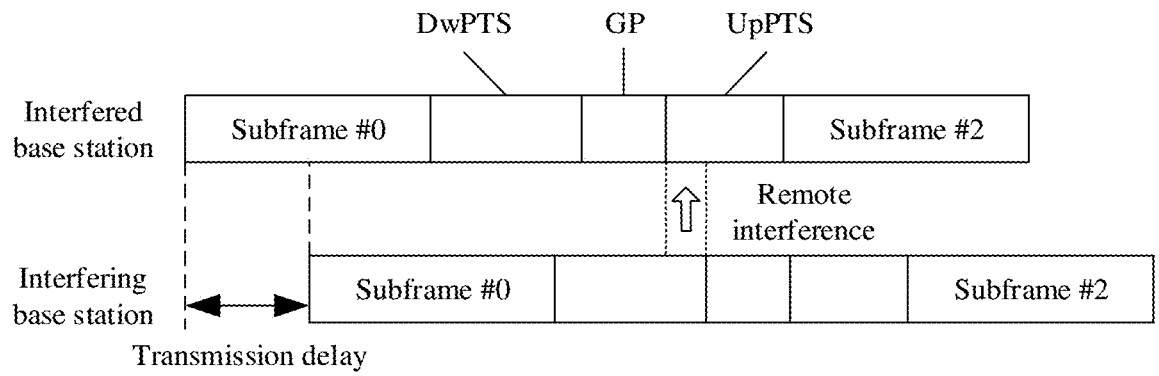

FIG. 1

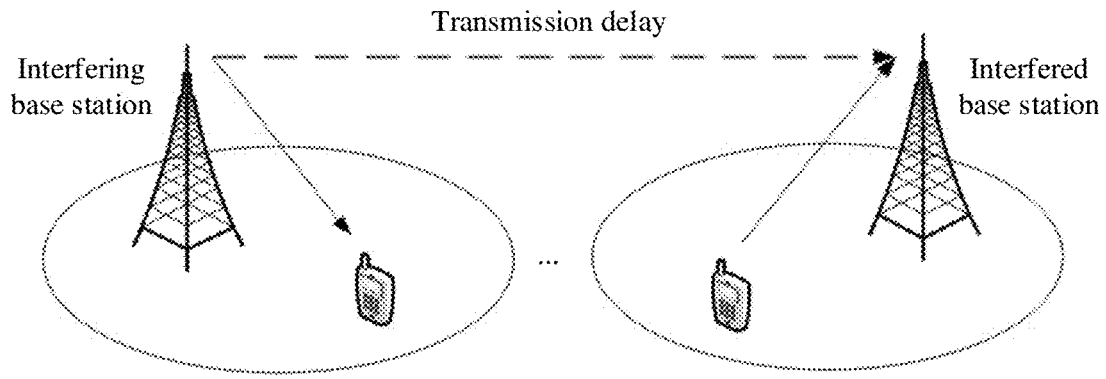

FIG. 2

A base station determines M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers — 301

If a ratio of M to N is greater than a third preset value, skip scheduling the N CSI beams included in the same-layer beams — 302

FIG. 3

INTERFERENCE SUPPRESSION METHOD AND BASE STATION

CROSS-REFERENCE TO RELATED APPLICATIONS

This application is a continuation of International Application No. PCT/CN2020/091755, filed on May 22, 2020, which claims priority to Chinese Patent Application No. 201910429837.0, filed on May 22, 2019. The disclosures of the aforementioned applications are hereby incorporated by reference in their entireties.

TECHNICAL FIELD

This application relates to the communication field, and in particular, to an interference suppression method and a base station.

BACKGROUND

An atmospheric duct refers to an atmospheric space that enables an electromagnetic wave to return and zigzag propagate. The atmospheric space may be close to the ground, where the upper wall is atmospheric stratification, and the lower wall is the earth's surface; or may be suspended, where the upper and lower walls are both atmospheric stratification. Occurrence of an atmospheric duct is determined by weather conditions. Usually, an atmospheric duct is easily formed in the atmosphere in stable and sunny weather after rain in summer. In a coastal area, an atmospheric duct is easily generated when a dry hot air mass on land moves to the sea. Usually, relatively many atmospheric ducts are generated in low-latitude and middle-latitude areas, and in particular, more atmospheric ducts occur in a coastal area and on the sea.

An atmospheric duct causes relatively strong interference to an uplink channel of a base station system. For example, in a time division duplex long term evolution (TDD-LTE) base station system, an uplink timeslot of a specific base station may be interfered by a downlink timeslot of another base station hundreds of kilometers or even thousands of kilometers away. Consequently, an access success rate, a handover success rate, and the like of the base station are severely reduced, thereby causing great troubles to user perception and operator operation and maintenance.

Therefore, the base station needs to take effective measures against atmospheric duct interference.

The atmospheric duct interference is generally from top to bottom (that is, the interference is from the sky to the base station). Currently, the interference is usually reduced by adjusting the downtilt angle of the base station. However, increasing the downtilt angle requires a remote electrical tilt antenna or onsite manual adjustment. Consequently, construction costs of antenna replacement are high.

SUMMARY

This application provides an interference suppression method and a base station, to implement beam-level interference detection, and implement beam-level interference suppression, so that atmospheric duct interference can be effectively reduced, and manual adjustment is not needed, thereby reducing onsite costs.

According to a first aspect, this application provides an interference suppression method, including: determining M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers; and if a ratio of M to N is greater than a third preset value, skipping scheduling and sending the N CSI beams included in the same-layer beams.

In an optional embodiment, the method further includes: obtaining a first angle range corresponding to the M CSI beams; and determining at least one synchronization signal block SSB beam corresponding to the M CSI beams, where an intersection set between a second angle range corresponding to the at least one SSB beam and the first angle range is not an empty set; and the if a ratio of M to N is greater than a third preset value, skipping scheduling and sending the N CSI beams included in the same-layer beams includes: if the ratio of M to N is greater than the third preset value, skipping scheduling and sending the N CSI beams included in the same-layer beams and the at least one SSB beam.

In an optional embodiment, the first angle range includes a first horizontal angle range and a first vertical angle range, and the second angle range includes a second horizontal angle range and a second vertical angle range; and the determining at least one synchronization signal block SSB beam corresponding to the M CSI beams, where an intersection set between a second angle range corresponding to the at least one SSB beam and the first angle range is not an empty set includes: determining the at least one synchronization signal block SSB beam corresponding to the M CSI beams, where an intersection set between the second horizontal angle range and the first horizontal angle range is not an empty set, and an intersection set between the second vertical angle range and the first vertical angle range is not an empty set.

In an optional embodiment, the method further includes: obtaining a first angle range corresponding to the M CSI beams; and determining at least one phase tracking reference signal PTRS beam corresponding to the M CSI beams, where an intersection set between a third angle range corresponding to the at least one PTRS beam and the first angle range is not an empty set; and the if a ratio of M to N is greater than a third preset value, skipping scheduling and sending the N CSI beams included in the same-layer beams includes: if the ratio of M to N is greater than the third preset value, skipping scheduling and sending the N CSI beams included in the same-layer beams and the at least one PTRS beam.

In an optional embodiment, the first angle range includes a first horizontal angle range and a first vertical angle range, and the third angle range includes a third horizontal angle range and a third vertical angle range; and the determining at least one phase tracking reference signal PTRS beam corresponding to the M CSI beams, where an intersection set between a third angle range corresponding to the at least one PTRS beam and the first angle range is not an empty set includes: determining the at least one PTRS beam corresponding to the M CSI beams, where an intersection set between the third horizontal angle range and the first horizontal angle range is not an empty set, and an intersection set between the third vertical angle range and the first vertical angle range is not an empty set.

In an optional embodiment, the method further includes: if it is determined that the interference noise power of the DMRS pilot signal carried on each of the M CSI beams is not greater than the first preset value or the interference noise power of the SRS pilot signal carried on each of the M CSI beams is not greater than the second preset value, scheduling and sending the N CSI beams included in the same-layer beams.

According to a second aspect, this application provides an interference suppression method, including: determining M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; obtaining a first angle range corresponding to the M CSI beams; determining at least one null-steering angle based on the first angle range, where the at least one null-steering angle belongs to the first angle range; determining a directivity pattern gain and a suppression multiple that correspond to each null-steering angle in the at least one null-steering angle, where the suppression multiple is a ratio of a suppression amount to the directivity pattern gain; and determining, based on the directivity pattern gain and the suppression multiple that correspond to each null-steering angle, a cancellation directivity pattern gain corresponding to each null-steering angle, where a sum of the cancellation directivity pattern gain and a product of the directivity pattern gain and the suppression multiple is zero.

In an optional embodiment, the obtaining a first angle range corresponding to the M CSI beams includes: obtaining M beam IDs corresponding to the M CSI beams; and determining, based on a correspondence between a beam ID and an angle range, a first angle range corresponding to each beam ID.

In an optional embodiment, the determining a directivity pattern gain and a suppression multiple that correspond to each null-steering angle in the at least one null-steering angle includes: determining a directivity pattern gain and a suppression multiple Z that correspond to each null-steering angle in the at least one null-steering angle, where the directivity pattern gain corresponding to each null-steering angle is calculated by using the following formula:

$$\sum_{n=0}^{X-1} a_n e^{j2\pi n \frac{d}{\lambda} \sin\varphi},$$

where X is a quantity of transceiver units, $a_n$ is a basic weight, d is an element spacing, $\lambda$ is a wavelength, and $\varphi$ is a horizontal plane null-steering angle.

In an optional embodiment, the determining, based on the directivity pattern gain and the suppression multiple that correspond to each null-steering angle, a cancellation directivity pattern gain corresponding to each null-steering angle includes: determining, based on the directivity pattern gain and the suppression multiple Z that correspond to each null-steering angle, by using the following formula, the cancellation directivity pattern gain corresponding to each null-steering angle:

$$-Z * \sum_{n=0}^{X-1} a_n e^{j2\pi n \frac{d}{\lambda} \sin\varphi}.$$

In an optional embodiment, the determining a directivity pattern gain and a suppression multiple Z that correspond to each null-steering angle in the at least one null-steering angle includes: determining a first directivity pattern gain matrix A and the suppression multiple Z that correspond to the at least one null-steering angle, where the first directivity pattern gain matrix A is specifically:

$$A = -Z * \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \ldots, \sum_{n=0}^{X-1} a_n e^{j2\pi n \frac{d}{\lambda} \sin\varphi_Y} \right]^T,$$

where X is the quantity of transceiver units, $a_n$ is the basic weight, d is the element spacing, $\lambda$ is the wavelength, $\varphi$ is the horizontal plane null-steering angle, and Y is a quantity of null-steering angles.

In an optional embodiment, the determining, based on the directivity pattern gain and the suppression multiple that correspond to each null-steering angle, a cancellation directivity pattern gain corresponding to each null-steering angle includes: determining a cancellation directivity pattern weight matrix P based on the first directivity pattern gain matrix A, a second directivity pattern gain matrix B, and the suppression multiple Z, where the second directivity pattern gain matrix B is the following matrix:

$$B = \begin{bmatrix} e^{j2\pi 0 \frac{d}{\lambda} \sin\varphi_1}, \ldots, e^{j2\pi(X-1)\frac{d}{\lambda}\sin\varphi_1} \\ , \\ \vdots \\ , \\ e^{j2\pi 0 \frac{d}{\lambda} \sin\varphi_Y}, \ldots, e^{j2\pi(X-1)\frac{d}{\lambda}\sin\varphi_Y} \end{bmatrix};$$

and the cancellation directivity pattern weight matrix P is the following matrix:

$P = B^H(BB^H)^{-1}A$; and determining the cancellation directivity pattern gain based on the cancellation directivity pattern weight matrix P.

In an optional embodiment, the method further includes: if it is determined that the interference noise power of the DMRS pilot signal carried on each of the M CSI beams is not greater than the first preset value or the interference noise power of the SRS pilot signal carried on each of the M CSI beams is not greater than the second preset value, skipping suppressing the directivity pattern gain corresponding to each null-steering angle.

According to a third aspect, this application provides an interference suppression method, including: determining M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; obtaining a first angle range corresponding to the M CSI beams; determining at least one null-steering angle based on the first angle range, where the at least one null-steering angle belongs to the first angle range; determining a vertical plane suppression angle corresponding to each of the at least one null-steering angle; and performing side lobe suppression on the suppression angle in a vertical plane gain directivity pattern, to obtain a maximum antenna gain after side lobe suppression.

In an optional embodiment, the performing side lobe suppression on the suppression angle in a vertical plane gain directivity pattern, to obtain a maximum antenna gain after side lobe suppression includes: determining an amplitude weight and a phase weight of an array element in each row and each column; determining a radiation field phase difference between two adjacent array element rows, a current excitation phase difference between two adjacent array element rows, a radiation field phase difference between two adjacent array element columns, and a current excitation phase difference between two adjacent array element columns; determining that a horizontal plane azimuth and a horizontal plane suppression angle in the maximum antenna gain are 0; and determining the maximum antenna gain based on the amplitude weight, the phase weight, the radiation field phase difference between two adjacent array element rows, the current excitation phase difference between two adjacent array element rows, the radiation field phase difference between two adjacent array element columns, and the current excitation phase difference between two adjacent array element columns.

In an optional embodiment, the maximum antenna gain is expressed by using the following formula:

$$E(\theta, \varphi) = \sum_{m=0}^{N_x-1} \sum_{k=0}^{N_y-1} I(m, k) e^{j\gamma mk} e^{jk\left(\frac{2\pi}{\lambda} d_y(\sin\theta\cos\varphi - \sin\theta_0\cos\varphi_0)\right)} e^{jm\left(\frac{2\pi}{\lambda} d_x(\sin\theta\sin\varphi - \sin\theta_0\sin\varphi_0)\right)},$$

where θ is a vertical plane antenna tilt angle, φ is the horizontal azimuth, $\theta_0$ is the suppression angle, $\varphi_0$ is the horizontal plane suppression angle, Nx is a quantity of array element rows, Ny is a quantity of array element columns, I(m,k) is an amplitude weight of an array element in an $m^{th}$ row and a $k^{th}$ column, and $e^{j\gamma mk}$ is a phase weight of the array element in the $m^{th}$ row and the $k^{th}$ column;

$$\frac{2\pi}{\lambda} d_x \sin\theta\sin\varphi$$

is the radiation field phase difference between two adjacent array element rows;

$$\frac{2\pi}{\lambda} d_x \sin\theta_0 \sin\varphi_0$$

is the current excitation phase difference between two adjacent array element rows;

$$\frac{2\pi}{\lambda} d_x \sin\theta\cos\varphi$$

is the radiation field phase difference between two adjacent array element columns; and $$\frac{2\pi}{\lambda} d_x \sin\theta\cos\varphi$$

is the current excitation phase difference between two adjacent array element columns.

In an optional embodiment, the method further includes: if it is determined that the interference noise power of the DMRS pilot signal carried on each of the M CSI beams is not greater than the first preset value or the interference noise power of the SRS pilot signal carried on each of the M CSI beams is not greater than the second preset value, skipping performing side lobe suppression on the suppression angle in a vertical plane gain directivity pattern.

According to a fourth aspect, this application provides a base station, including: a processing module, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers, where if a ratio of M to N is greater than a third preset value, the processing module is further configured to skip scheduling and sending the N CSI beams included in the same-layer beams.

In an optional embodiment, the base station further includes: an obtaining module, configured to obtain a first angle range corresponding to the M CSI beams, where the processing module is further configured to determine at least one synchronization signal block SSB beam corresponding to the M CSI beams, where an intersection set between a second angle range corresponding to the at least one SSB beam and the first angle range is not an empty set; and if the ratio of M to N is greater than the third preset value, the processing module is specifically configured to skip scheduling and sending the N CSI beams included in the same-layer beams and the at least one SSB beam.

In an optional embodiment, the first angle range includes a first horizontal angle range and a first vertical angle range, and the second angle range includes a second horizontal angle range and a second vertical angle range; and the processing module is specifically configured to determine the at least one synchronization signal block SSB beam corresponding to the M CSI beams, where an intersection set between the second horizontal angle range and the first horizontal angle range is not an empty set, and an intersection set between the second vertical angle range and the first vertical angle range is not an empty set.

In an optional embodiment, the obtaining module is further configured to obtain a first angle range corresponding to the M CSI beams; the processing module is further configured to determine at least one phase tracking reference signal PTRS beam corresponding to the M CSI beams, where an intersection set between a third angle range corresponding to the at least one PTRS beam and the first angle range is not an empty set; and if the ratio of M to N is greater than the third preset value, the processing module is specifically configured to skip scheduling and sending the N CSI beams included in the same-layer beams and the at least one PTRS beam.

In an optional embodiment, the first angle range includes a first horizontal angle range and a first vertical angle range, and the third angle range includes a third horizontal angle range and a third vertical angle range; and the processing module is specifically configured to determine the at least one PTRS beam corresponding to the M CSI beams, where an intersection set between the third horizontal angle range and the first horizontal angle range is not an empty set, and an intersection set between the third vertical angle range and the first vertical angle range is not an empty set.

In an optional embodiment, the processing module is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, schedule and send the N CSI beams included in the same-layer beams.

According to a fifth aspect, this application provides a base station, including: a processing module, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; and an obtaining module, configured to obtain a first angle range corresponding to the M CSI beams, where the processing module is further configured to: determine at least one null-steering angle based on the first angle range, where the at least one null-steering angle belongs to the first angle range; determine a directivity pattern gain and a suppression multiple that correspond to each null-steering angle in the at least one null-steering angle, where the suppression multiple is a ratio of a suppression amount to the directivity pattern gain; and determine, based on the directivity pattern gain and the suppression multiple that correspond to each null-steering angle, a cancellation directivity pattern gain corresponding to each null-steering angle, where a sum of the cancellation directivity pattern gain and a product of the directivity pattern gain and the suppression multiple is zero.

In an optional embodiment, the obtaining module is specifically configured to obtain M beam IDs corresponding to the M CSI beams; and the processing module is further configured to determine, based on a correspondence between a beam ID and an angle range, a first angle range corresponding to each beam ID.

In an optional embodiment, the processing module is specifically configured to determine a directivity pattern gain and a suppression multiple Z that correspond to each null-steering angle in the at least one null-steering angle, where the directivity pattern gain corresponding to each null-steering angle is calculated by using the following formula:

$$\sum_{n=0}^{X-1} a_n e^{j2\pi n \frac{d}{\lambda} \sin\varphi},$$

where X is a quantity of transceiver units, $a_n$ is a basic weight, d is an element spacing, $\lambda$ is a wavelength, and $\varphi$ is a horizontal plane null-steering angle.

In an optional embodiment, the processing module is specifically configured to determine, based on the directivity pattern gain and the suppression multiple Z that correspond to each null-steering angle, by using the following formula, the cancellation directivity pattern gain corresponding to each null-steering angle:

$$-Z * \sum_{n=0}^{X-1} a_n e^{j2\pi n \frac{d}{\lambda} \sin\varphi}.$$

In an optional embodiment, the processing module is specifically configured to determine a first directivity pattern gain matrix A and the suppression multiple Z that correspond to the at least one null-steering angle, where the first directivity pattern gain matrix A is specifically:

$$A = \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \ldots, \sum_{n=0}^{X-1} a_n e^{j2\pi n \frac{d}{\lambda} \sin\varphi_Y} \right]^T,$$

where X is the quantity of transceiver units, $a_n$ is the basic weight, d is the element spacing, $\lambda$ is the wavelength, $\varphi$ is the horizontal plane null-steering angle, and Y is a quantity of null-steering angles.

In an optional embodiment, the processing module is specifically configured to: determine a cancellation directivity pattern weight matrix P based on the first directivity pattern gain matrix A, a second directivity pattern gain matrix B, and the suppression multiple Z, where the second directivity pattern gain matrix B is the following matrix:

$$B = \begin{bmatrix} e^{j2\pi 0 \frac{d}{\lambda} \sin\varphi_1}, \ldots, e^{j2\pi(X-1)\frac{d}{\lambda} \sin\varphi_1} \\ , \\ \vdots \\ , \\ e^{j2\pi 0 \frac{d}{\lambda} \sin\varphi_Y}, \ldots, e^{j2\pi(X-1)\frac{d}{\lambda} \sin\varphi_Y} \end{bmatrix};$$

and the cancellation directivity pattern weight matrix P is the following matrix:

$P = B^H(BB^H)^{-1}A$; and determining the cancellation directivity pattern gain based on the cancellation directivity pattern weight matrix P.

In an optional embodiment, the processing module is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, skip suppressing the directivity pattern gain corresponding to each null-steering angle.

According to a sixth aspect, this application provides a base station, including: a processing module, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; and an obtaining module, configured to obtain a first angle range corresponding to the M CSI beams, where the processing module is further configured to: determine at least one null-steering angle based on the first angle range, where the at least one null-steering angle belongs to the first angle range; determine a vertical plane suppression angle corresponding to each of the at least one null-steering angle; and perform side lobe suppression on the suppression angle in a vertical plane gain directivity pattern, to obtain a maximum antenna gain after side lobe suppression.

In an optional embodiment, the processing module is specifically configured to: determine an amplitude weight and a phase weight of an array element in each row and each column; determine a radiation field phase difference between two adjacent array element rows, a current excitation phase difference between two adjacent array element rows, a radiation field phase difference between two adjacent array element columns, and a current excitation phase difference between two adjacent array element columns; determine that a horizontal plane azimuth and a horizontal plane suppression angle in the maximum antenna gain are 0; and determine the maximum antenna gain based on the amplitude weight, the phase weight, the radiation field phase difference between two adjacent array element rows, the current excitation phase difference between two adjacent array element rows, the radiation field phase difference between two adjacent array element columns, and the current excitation phase difference between two adjacent array element columns.

In an optional embodiment, the maximum antenna gain is expressed by using the following formula:

$$E(\theta, \varphi) = \sum_{m=0}^{N_x-1}\sum_{k=0}^{N_y-1} I(m,k) e^{j\gamma mk} e^{jk\left(\frac{2\pi}{\lambda}d_y(\sin\theta\cos\varphi - \sin\theta_0\cos\varphi_0)\right)} e^{jm\left(\frac{2\pi}{\lambda}d_x(\sin\theta\sin\varphi - \sin\theta_0\sin\varphi_0)\right)},$$

where θ is a vertical plane antenna tilt angle, φ is the horizontal azimuth, $\theta_0$ is the suppression angle, $\varphi_0$ is the horizontal plane suppression angle, Nx is a quantity of array element rows, Ny is a quantity of array element columns, I(m,k) is an amplitude weight of an array element in an $m^{th}$ row and a $k^{th}$ column, and $e^{j\gamma mk}$ is a phase weight of the array element in the $m^{th}$ row and the $k^{th}$ column;

$$\frac{2\pi}{\lambda}d_x\sin\theta\cos\varphi$$

is the radiation field phase difference between two adjacent array element rows;

$$\frac{2\pi}{\lambda}d_x\sin\theta_0\sin\varphi_0$$

is the current excitation phase difference between two adjacent array element rows;

$$\frac{2\pi}{\lambda}d_x\sin\theta\cos\varphi$$

is the radiation field phase difference between two adjacent array element columns; and $$\frac{2\pi}{\lambda}d_x\sin\theta\cos\varphi$$

is the current excitation phase difference between two adjacent array element columns.

In an optional embodiment, the processing module is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, skip performing side lobe suppression on the suppression angle in a vertical plane gain directivity pattern.

It can be learned from the foregoing technical solutions that this application has the following advantages:

In the embodiments of this application, the base station determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, the M CSI beams are same-layer beams on the horizontal plane, the same-layer beams include the N CSI beams, and M and N are positive integers; and if the ratio of M to N is greater than the third preset value, the base station skips scheduling and sending the N CSI beams included in the same-layer beams. In the foregoing manner, interference noise power of a pilot signal on a CSI beam is used to determine whether the CSI beam is an interfered beam, to implement the beam-level interference detection, and implement the beam-level interference suppression, so that the atmospheric duct interference can be effectively reduced, and the manual adjustment is not needed, thereby reducing the onsite costs.

BRIEF DESCRIPTION OF THE DRAWINGS

FIG. 1 is a structure of a time division duplex frame in a TDD-LTE system;

FIG. 2 is a schematic diagram of a TDD-LTE remote interference scenario;

FIG. 3 is a schematic flowchart of an interference suppression method according to an embodiment of this application;

DETAILED DESCRIPTION OF ILLUSTRATIVE EMBODIMENTS

Figure 4:
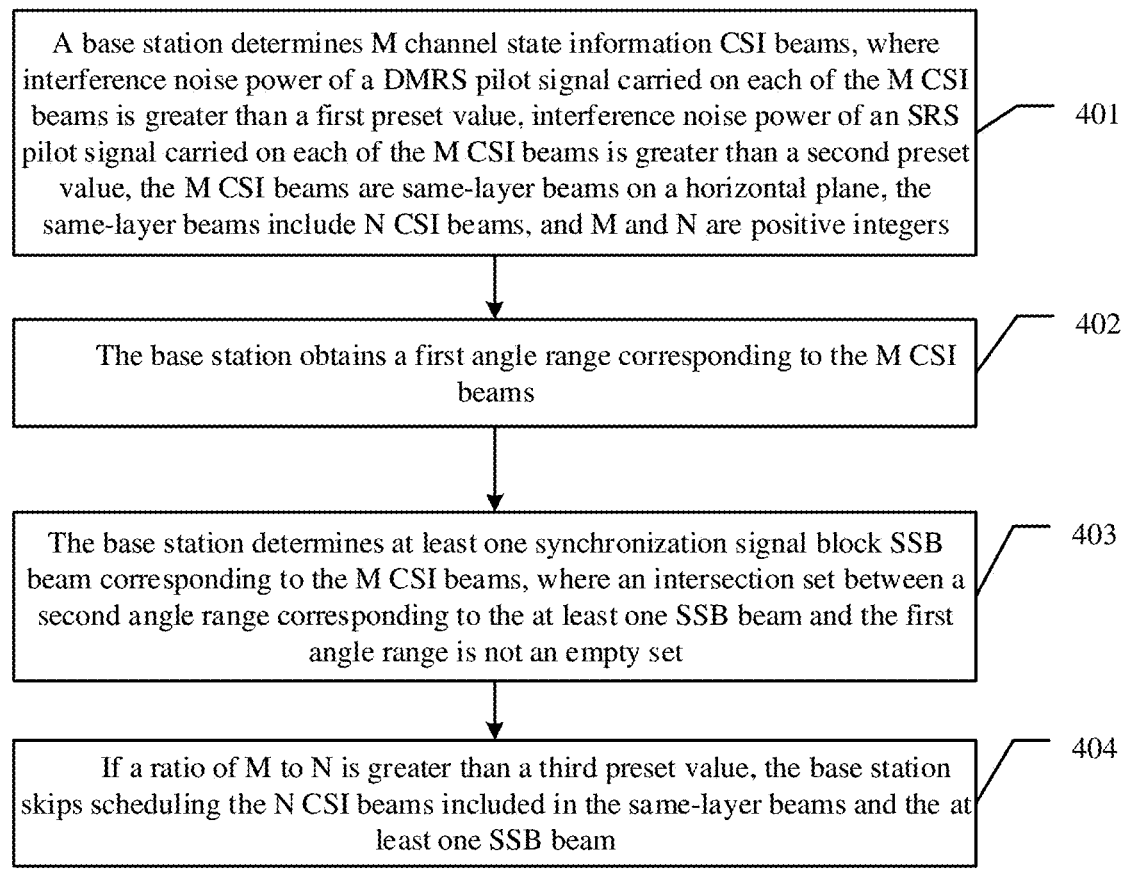
FIG. 4 is a schematic flowchart of another interference suppression method according to an embodiment of this application.

This application provides an interference suppression method and a base station, to implement beam-level interference detection, and implement beam-level interference suppression, so that atmospheric duct interference can be effectively reduced, and manual adjustment is not needed, thereby reducing onsite costs.

FIG. 1 shows a time division duplex (TDD) frame structure (a 5 ms conversion interval) in which TYPE2 (type 2) is used in a TDD-LTE system. A special subframe of the frame structure includes three special timeslots: a DwPTS, a GP (guard period), and an UpPTS. The DwPTS is used for transmission of a primary synchronization signal (PSS) in a downlink synchronization signal of a cell, a physical control format indicator channel (PCFICH), a physical downlink control channel (PDCCH), a physical hybrid automatic repeat request indicator channel (PHICH), a physical downlink shared channel (PDSCH), and the like. The UpPTS is used for transmission of a packet random access channel (PRACH) and a sounding reference signal (SRS), but cannot be used for transmission of a physical uplink shared channel (PUSCH) and a physical uplink control channel (PUCCH). The GP is a guard period between the DwPTS and the UpPTS, and is mainly used to avoid interference, caused by a multipath delay, of data in the DwPTS to data in the UpPTS.

An atmospheric duct refers to an atmospheric space that enables an electromagnetic wave to return and zigzag propagate. The atmospheric space may be close to the ground, where the upper wall is atmospheric stratification, and the lower wall is the earth's surface; or may be suspended, where the upper and lower walls are both atmospheric stratification. Occurrence of an atmospheric duct is determined by weather conditions. Usually, an atmospheric duct is easily formed in the atmosphere in stable and sunny weather after rain in summer. In a coastal area, an atmospheric duct is easily generated when a dry hot air mass on land moves to the sea. Usually, relatively many atmospheric ducts are generated in low-latitude and middle-latitude areas, and in particular, more atmospheric ducts occur in a coastal area and on the sea.

An atmospheric duct causes relatively strong interference to an uplink channel of a base station system. In a time division synchronous code division multiple access long term evolution (TDS CDMA long term evolution, TD LTE) system, a time division duplex mode is used, and synchronization needs to be maintained between different base stations. When a remote base station reaches a specific height level and an atmospheric duct phenomenon exists, a downlink signal transmitted by an interfering base station at high power in a regular downlink subframe and a downlink pilot timeslot (DwPTS) may arrive, after a propagation delay, at an uplink pilot timeslot (UpPTS) of an interfered base station, and affect the UpPTS of the interfered base station and even receiving of uplink service data. FIG. 2 is a schematic diagram of a TDD-LTE remote interference scenario. In FIG. 2, remote interference is represented by using a downlink signal of only one base station. However, in an actual environment, the remote interference may be a result of a joint action of a cluster of base stations that are close in location, that is, an interference signal may be a signal obtained through superimposition of downlink signals of a plurality of base stations.

To resolve the foregoing technical problem, this application provides an interference suppression method.

FIG. 3 is a schematic flowchart of an interference suppression method according to an embodiment of this application. The method includes the following steps.

301: A base station determines M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers.

In this embodiment of this application, the base station may detect the interference noise power of the DMRS pilot signal carried on the CSI beam and the interference noise power of the SRS pilot signal carried on the CSI beam. If the interference noise power of the DMRS pilot signal is greater than the first preset value and the interference noise power of the SRS pilot signal is greater than the second preset value, the base station may determine that there is interference to the CSI beam.

In an embodiment, the base station may detect, for a plurality of times, the interference noise power of the DMRS pilot signal carried on the CSI beam, accumulate results of a plurality of times of detection, then perform threshold decision, and determine whether an accumulated value is greater than a corresponding threshold. Similarly, the base station may detect, for a plurality of times, the interference noise power of the SRS pilot signal carried on the CSI beam, accumulate results of a plurality of times of detection, then perform threshold decision, and determine whether an accumulated value is greater than a corresponding threshold. If the accumulated value for the interference noise power of the DMRS pilot signal is greater than the corresponding threshold, and the accumulated value for the interference noise power of the SRS pilot signal is greater than the corresponding threshold, the base station may determine that there is interference to the CSI beam.

In this embodiment of this application, the base station may detect that there is interference to a plurality of CSI beams, and determine that M CSI beams in the plurality of CSI beams are same-layer beams on the horizontal plane. It should be noted that the base station may detect that there is interference to a plurality of CSI beams, and determine that in the plurality of CSI beams, M1 CSI beams are same-layer beams on the horizontal plane, M2 CSI beams are same-layer beams on the horizontal plane (which are not at a same layer as the aforementioned M1 CSI beams), and so on. In this embodiment of this application, only one layer including interfered M CSI beams is described.

In this embodiment of this application, the base station may determine the M CSI beams are interfered beams at a same layer on the horizontal plane.

In an embodiment, the base station may determine, by using a scheduling relationship between an antenna beam and a DMRS pilot signal, a beam ID corresponding to a CSI beam to which there is interference, or the base station may determine, by using a scheduling relationship between a beam and an SRS pilot signal, a beam ID corresponding to a CSI beam to which there is interference.

Specifically, because the base station knows a correspondence for a DMRS pilot signal or an SRS pilot signal scheduled on each CSI beam, when the base station determines that a CSI beam is interfered, the base station may determine, by using a correspondence between a DMRS pilot signal or an SRS pilot signal on the CSI beam and a beam ID, a beam ID corresponding to the interfered CSI beam.

302: If a ratio of M to N is greater than a third preset value, the N CSI beams included in the same-layer beams are not scheduled and sent.

In this embodiment of this application, a layer at which the M CSI beams are located includes the N CSI beams. M may be equal to N, to be specific, all CSI beams at this layer are interfered beams. Alternatively, M may be less than N, to be specific, some CSI beams at this layer are interfered beams, that is, not all beams are interfered beams.

In this embodiment of this application, if the ratio of M to N is greater than the third preset value, the N CSI beams included in the same-layer beams are not scheduled and sent. The third preset value may be selected based on an actual requirement, and is not limited in this application. In an implementation, the third preset value may be 0.5. To be specific, if at this layer, a quantity of interfered CSI beams exceeds a quantity of uninterfered CSI beams, the base station skips scheduling and sending the N CSI beams included in beams at this layer, that is, the base station schedules and sends no CSI beam included in the beams at this layer.

In this embodiment of this application, if it is determined that the interference noise power of the DMRS pilot signal carried on each of the M CSI beams is not greater than the first preset value or the interference noise power of the SRS pilot signal carried on each of the M CSI beams is not greater than the second preset value, the N CSI beams included in the same-layer beams are scheduled and sent.

In a current technology, in a manner of manually adjusting a downtilt angle, an automatic rollback cannot be performed after interference disappears. In this embodiment of this application, an automatic rollback can be performed after interference disappears.

In this embodiment of this application, the base station determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, the M CSI beams are same-layer beams on the horizontal plane, the same-layer beams include the N CSI beams, and M and N are positive integers; and if the ratio of M to N is greater than the third preset value, the base station skips scheduling and sending the N CSI beams included in the same-layer beams. In the foregoing manner, interference noise power of a pilot signal on a CSI beam is used to determine whether the CSI beam is an interfered beam, to implement beam-level interference detection, and implement beam-level interference suppression, so that atmospheric duct interference can be effectively reduced, and manual adjustment is not needed, thereby reducing onsite costs, and improving precision.

FIG. 4 is a schematic flowchart of another interference suppression method according to an embodiment of this application. The method includes the following steps.

401: A base station determines M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers.

For specific descriptions of step 401, refer to descriptions of corresponding step 301 in FIG. 3. Details are not described herein again.

402: The base station obtains a first angle range corresponding to the M CSI beams.

In an embodiment, the first angle range includes a first horizontal angle range and a first vertical angle range. For example, the first angle range is A1 degrees to A2 degrees on the horizontal plane, and is B1 degrees to B2 degrees on a vertical plane.

In an embodiment, the base station may obtain M beam IDs corresponding to the M CSI beams, and determine, based on a correspondence between a beam ID and an angle range, a first angle range corresponding to each beam ID.

403: The base station determines at least one synchronization signal block SSB beam corresponding to the M CSI beams, where an intersection set between a second angle range corresponding to the at least one SSB beam and the first angle range is not an empty set.

In other words, after determining the interfered M CSI beams, the base station may determine an interfered SSB beam based on a beam range of the interfered M CSI beams. Specifically, the base station may determine, depending on whether there is an SSB beam in a range of the M CSI beams, whether there is the interfered SSB beam.

In an embodiment, the second angle range includes a second horizontal angle range and a second vertical angle range. In this case, the base station determines the at least one synchronization signal block SSB beam corresponding to the M CSI beams, where an intersection set between the second horizontal angle range and the first horizontal angle range is not an empty set, and an intersection set between the second vertical angle range and the first vertical angle range is not an empty set.

In an embodiment, the base station may further determine a beam ID corresponding to the at least one SSB beam.

In another embodiment, the base station may further determine at least one phase tracking reference signal PTRS beam corresponding to the M CSI beams, where an intersection set between a third angle range corresponding to the at least one PTRS beam and the first angle range is not an empty set.

The third angle range may include a third horizontal angle range and a third vertical angle range. In this case, the base station may determine the at least one PTRS beam corresponding to the M CSI beams, where an intersection set between the third horizontal angle range and the first horizontal angle range is not an empty set, and an intersection set between the third vertical angle range and the first vertical angle range is not an empty set.

404: If the ratio of M to N is greater than the third preset value, the base station skips scheduling and sending the N CSI beams included in the same-layer beams and the at least one SSB beam.

In this embodiment of this application, a layer at which the M CSI beams are located includes the N CSI beams. M may be equal to N, to be specific, all CSI beams at this layer are interfered beams. Alternatively, M may be less than N, to be specific, some CSI beams at this layer are interfered beams, that is, not all beams are interfered beams.

In this embodiment of this application, if the ratio of M to N is greater than the third preset value, the N CSI beams included in the same-layer beams and the at least one SSB beam are not scheduled and sent. The third preset value may be selected based on an actual requirement, and is not limited in this application. In an implementation, the third preset value may be 0.5. To be specific, if at this layer, a quantity of interfered CSI beams exceeds a quantity of uninterfered CSI beams, the base station skips scheduling and sending the N CSI beams included in beams at this layer and an interfered SSB beam, that is, the base station schedules and sends no CSI beam included in the beams at this layer and the interfered SSB beam.

In another embodiment, the base station determines the at least one phase tracking reference signal PTRS beam corresponding to the M CSI beams. In this case, if the ratio of M to N is greater than the third preset value, the base station skips scheduling and sending the N CSI beams included in the same-layer beams and the at least one PTRS beam.

In this embodiment of this application, the base station determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, the M CSI beams are same-layer beams on the horizontal plane, the same-layer beams include the N CSI beams, and M and N are positive integers; the base station obtains the first angle range corresponding to the M CSI beams; the base station determines the at least one synchronization signal block SSB beam corresponding to the M CSI beams, where the intersection set between the second angle range corresponding to the at least one SSB beam and the first angle range is not the empty set; and if the ratio of M to N is greater than the third preset value, the base station skips scheduling and sending the N CSI beams included in the same-layer beams and the at least one SSB beam. In the foregoing manner, interference noise power of a pilot signal on a CSI beam is used to determine whether the CSI beam is an interfered beam, to implement beam-level interference detection, and implement beam-level interference suppression, so that atmospheric duct interference can be effectively reduced, and manual adjustment is not needed, thereby reducing onsite costs, and improving precision.

Figure 5:
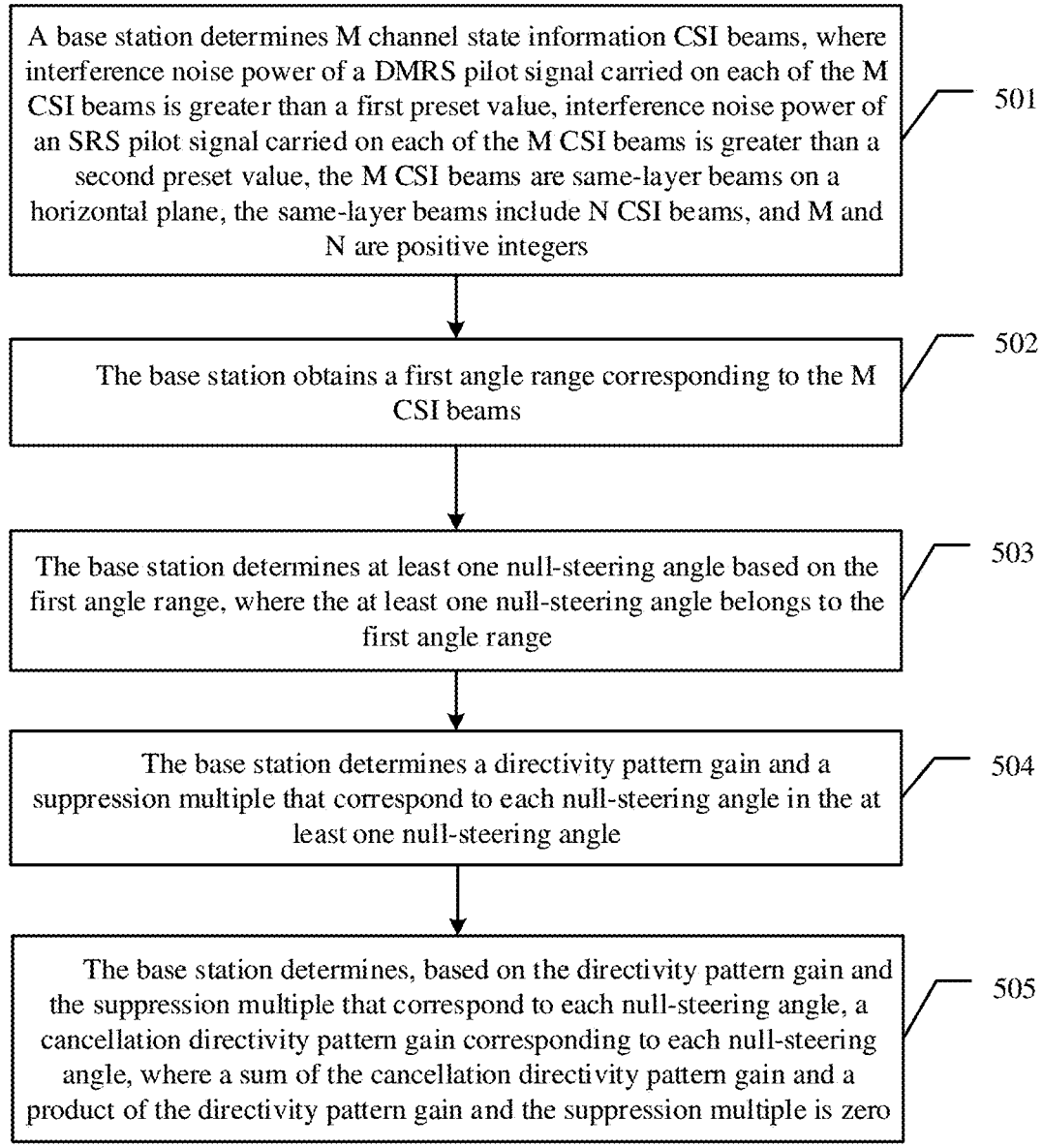
FIG. 5 is a schematic flowchart of another interference suppression method according to an embodiment of this application.

FIG. 5 is a schematic flowchart of another interference suppression method according to an embodiment of this application. The method includes the following steps.

501: A base station determines M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer.

For specific descriptions of step 501, refer to step 301 in the embodiment corresponding to FIG. 3. Details are not described herein again.

502: The base station obtains a first angle range corresponding to the M CSI beams.

For specific descriptions of step 502, refer to step 402 in the embodiment corresponding to FIG. 4. Details are not described herein again.

503: The base station determines at least one null-steering angle based on the first angle range, where the at least one null-steering angle belongs to the first angle range.

In this embodiment of this application, after obtaining the first angle range corresponding to the M CSI beams, the base station equivalently knows an angle range of an interfered beam. Further, the base station may determine the null-steering angle based on the angle range, where there may be one or more null-steering angles. This embodiment is described by using an example in which the null-steering angle is an angle on the horizontal plane.

504: The base station determines a directivity pattern gain and a suppression multiple that correspond to each null-steering angle in the at least one null-steering angle, where the suppression multiple is a ratio of a suppression amount to the directivity pattern gain.

In an embodiment, the base station may determine a directivity pattern gain and a suppression multiple Z that correspond to each null-steering angle in the at least one null-steering angle, where the directivity pattern gain corresponding to each null-steering angle is calculated by using the following formula:

$$\sum_{n=0}^{X-1} a_n e^{j2\pi n \frac{d}{\lambda} \sin\varphi},$$

where X is a quantity of transceiver units, $a_n$ is a basic weight, d is an element spacing, $\lambda$ is a wavelength, and $\varphi$ is a horizontal plane null-steering angle.

In an embodiment, the base station may further determine that the directivity pattern gain corresponding to each null-steering angle needs to be suppressed to (1-Z) times the original, and correspondingly, the suppression multiple is Z. For example, if complete suppression is wanted, it may be determined that the suppression multiple is 1, or it may be determined that the directivity pattern gain corresponding to the null-steering angle is suppressed to 0 times the original.

505: The base station determines, based on the directivity pattern gain and the suppression multiple that correspond to each null-steering angle, a cancellation directivity pattern gain corresponding to each null-steering angle, where a sum of the cancellation directivity pattern gain and a product of the directivity pattern gain and the suppression multiple is zero.

In an embodiment, after determining the directivity pattern gain and the suppression multiple Z that correspond to each of the at least one null-steering angle, the base station may determine, based on the directivity pattern gain and the suppression multiple that correspond to each null-steering angle, the cancellation directivity pattern gain corresponding to each null-steering angle, where the sum of the cancellation directivity pattern gain and the product of the directivity pattern gain and the suppression multiple is zero.

That is, $$Z * \sum_{n=0}^{X-1} a_n e^{j2\pi n \frac{d}{\lambda} \sin\varphi} + \sum_{n=0}^{X-1} p_n e^{j2\pi n \frac{d}{\lambda} \sin\varphi} = 0,$$

where $$\sum_{n=0}^{X-1} p_n e^{j2\pi n \frac{d}{\lambda} \sin\varphi}$$

is the cancellation directivity pattern gain, and $p_n$ is a cancellation weight.

Therefore, the cancellation directivity pattern gain corresponding to each null-steering angle is calculated by using the following formula:

$$-Z * \sum_{n=0}^{X-1} a_n e^{j2\pi n \frac{d}{\lambda} \sin\varphi}.$$

In an embodiment, the cancellation directivity pattern gain may be calculated by performing a matrix operation. Specifically, the base station may determine a first directivity pattern gain matrix A and the suppression multiple Z that correspond to the at least one null-steering angle, where the first directivity pattern gain matrix A is specifically:

$$A = -Z * \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \ldots, \sum_{n=0}^{X-1} a_n e^{j2\pi n \frac{d}{\lambda} \sin\varphi_Y} \right]^T,$$

where X is the quantity of transceiver units, $a_n$ is the basic weight, d is the element spacing, $\lambda$ is the wavelength, $\varphi$ is the null-steering angle, and Y is a quantity of null-steering angles.

The base station may determine a cancellation directivity pattern weight matrix P based on the first directivity pattern gain matrix A, a second directivity pattern gain matrix B, and the suppression multiple Z, where the second directivity pattern gain matrix B is the following matrix:

$$B = \begin{bmatrix} e^{j2\pi 0\frac{d}{\lambda}\sin\varphi_1}, \ldots, e^{j2\pi(X-1)\frac{d}{\lambda}\sin\varphi_1} \\ \vdots \\ e^{j2\pi 0\frac{d}{\lambda}\sin\varphi_Y}, \ldots, e^{j2\pi(X-1)\frac{d}{\lambda}\sin\varphi_Y} \end{bmatrix}.$$

The cancellation directivity pattern weight matrix P is the following matrix:

$P=B^H(BB^H)^{-1}A.$

The base station determines the cancellation directivity pattern gain based on the cancellation directivity pattern weight matrix P.

Next, this embodiment is explained by using an example.

In a scenario, a null-steering angle is 1 degree, 2 degrees, and 3 degrees on a horizontal plane.

It is determined that a first directivity pattern gain matrix corresponding to the null-steering angle is A, and a suppression multiple corresponding to the null-steering angle is 0.9, where A is specifically:

$$A = -0.9 * \left[ \sum_{n=0}^{X-1} a_n e^{j2\pi n\frac{d}{\lambda}\sin\varphi_1}, \sum_{n=0}^{X-1} a_n e^{j2\pi n\frac{d}{\lambda}\sin\varphi_2}, \ldots, \sum_{n=0}^{X-1} a_n e^{j2\pi n\frac{d}{\lambda}\sin\varphi_Y} \right]^T,$$

where X is 2, d is 90 mm, λ is 115.4 mm, is the null-steering angle, Y is a quantity (3) of null-steering angles, $a_n$ is a basic weight, and $$a_n = \begin{bmatrix} 1 & 0.99 - 0.085i \\ 1 & 0.98 - 0.17i \\ 1 & 0.96 - 0.25i \end{bmatrix}.$$

Specifically, $A(1) =$ $-0.9 * \left[ a_n(1,1) * e^{j2\pi(1-1)*\frac{90}{115.4}\sin\left(\frac{1}{180}*\pi\right)} + a_n(1,2) * e^{j2\pi(2-1)*\frac{90}{115.4}\sin\left(\frac{1}{180}*\pi\right)} \right] =$ $-1.78 + 0.15i;$ $A(2) =$ $-0.9 * \left[ a_n(2,1) * e^{j2\pi(1-1)*\frac{90}{115.4}\sin\left(\frac{2}{180}*\pi\right)} + a_n(2,2) * e^{j2\pi(2-1)*\frac{90}{115.4}\sin\left(\frac{2}{180}*\pi\right)} \right] =$ $-1.79 + 0.07i;$ and $A(3) =$ $-0.9 * \left[ a_n(3,1) * e^{j2\pi(1-1)*\frac{90}{115.4}\sin\left(\frac{3}{180}*\pi\right)} + a_n(3,2) * e^{j2\pi(2-1)*\frac{90}{115.4}\sin\left(\frac{3}{180}*\pi\right)} \right] =$ $-1.8 + 0.00i.$ A(1) represents an element in a $1^{st}$ row and a $1^{st}$ column in the matrix A, A(2) represents an element in the $1^{st}$ row and a $2^{nd}$ column in the matrix A, A(3) represents an element in the $1^{st}$ row and a $3^{rd}$ column in the matrix A, and $a_n(1,1)$ represents the element in the $1^{st}$ row and the $1^{st}$ column.

A cancellation directivity pattern weight matrix P is determined based on the first directivity pattern gain matrix A, a second directivity pattern gain matrix B, and the suppression multiple Z, where the second directivity pattern gain matrix B is the following matrix:

$$B = \begin{bmatrix} e^{j2\pi 0\frac{d}{\lambda}\sin\varphi_1}, \ldots, e^{j2\pi(X-1)\frac{d}{\lambda}\sin\varphi_1} \\ \vdots \\ e^{j2\pi 0\frac{d}{\lambda}\sin\varphi_Y}, \ldots, e^{j2\pi(X-1)\frac{d}{\lambda}\sin\varphi_Y} \end{bmatrix}, \text{ that is,}$$

$$B = \begin{bmatrix} e^{j2\pi(1-1)\frac{90}{115.4}\sin\left(\frac{1}{180}*\pi\right)} & e^{j2\pi(2-1)\frac{90}{115.4}\sin\left(\frac{1}{180}*\pi\right)} \\ e^{j2\pi(1-1)\frac{90}{115.4}\sin\left(\frac{2}{180}*\pi\right)} & e^{j2\pi(2-1)\frac{90}{115.4}\sin\left(\frac{2}{180}*\pi\right)} \\ e^{j2\pi(1-1)\frac{90}{115.4}\sin\left(\frac{3}{180}*\pi\right)} & e^{j2\pi(2-1)\frac{90}{115.4}\sin\left(\frac{3}{180}*\pi\right)} \end{bmatrix}.$$

The following is obtained through further calculation:

$$B = \begin{bmatrix} 1 & 0.99 + 0.08i \\ 1 & 0.98 + 0.17i \\ 1 & 0.96 + 0.25i \end{bmatrix}.$$

The cancellation directivity pattern weight matrix P is the following matrix:

$P=B^H(BB^H)^{-1}A.$

The following is obtained through further calculation:

$$P = \begin{bmatrix} -0.9 + 0.00i \\ -0.87 + 0.22i \end{bmatrix}.$$

The cancellation directivity pattern gain is determined based on the cancellation directivity pattern weight matrix P.

In this embodiment of this application, if it is determined that the interference noise power of the DMRS pilot signal carried on each of the M CSI beams is not greater than the first preset value or the interference noise power of the SRS pilot signal carried on each of the M CSI beams is not greater than the second preset value, the directivity pattern gain corresponding to each null-steering angle is not suppressed.

In a current technology, in a manner of manually adjusting a downtilt angle, an automatic rollback cannot be performed after interference disappears. In this embodiment of this application, an automatic rollback can be performed after interference disappears.

In this embodiment of this application, the base station determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, and M is the positive integer; the base station obtains the first angle range corresponding to the M CSI beams; the base station determines the at least one null-steering angle based on the first angle range, where the at least one null-steering angle belongs to the first angle range; the base station determines the directivity pattern gain and the suppression multiple that correspond to each null-steering angle in the at least one null-steering angle; and the base station determines, based on the directivity pattern gain and the suppression multiple that correspond to each null-steering angle, the cancellation directivity pattern gain corresponding to each null-steering angle, where the sum of the cancellation directivity pattern gain and the product of the directivity pattern gain and the suppression multiple is zero. In the foregoing manner, interference noise power of a pilot signal on a CSI beam is used to determine whether the CSI beam is an interfered beam, to implement beam-level interference detection, and implement beam-level null-steering suppression, so that atmospheric duct interference can be effectively reduced, and manual adjustment is not needed, thereby reducing onsite costs, and improving precision.

Figure 6:
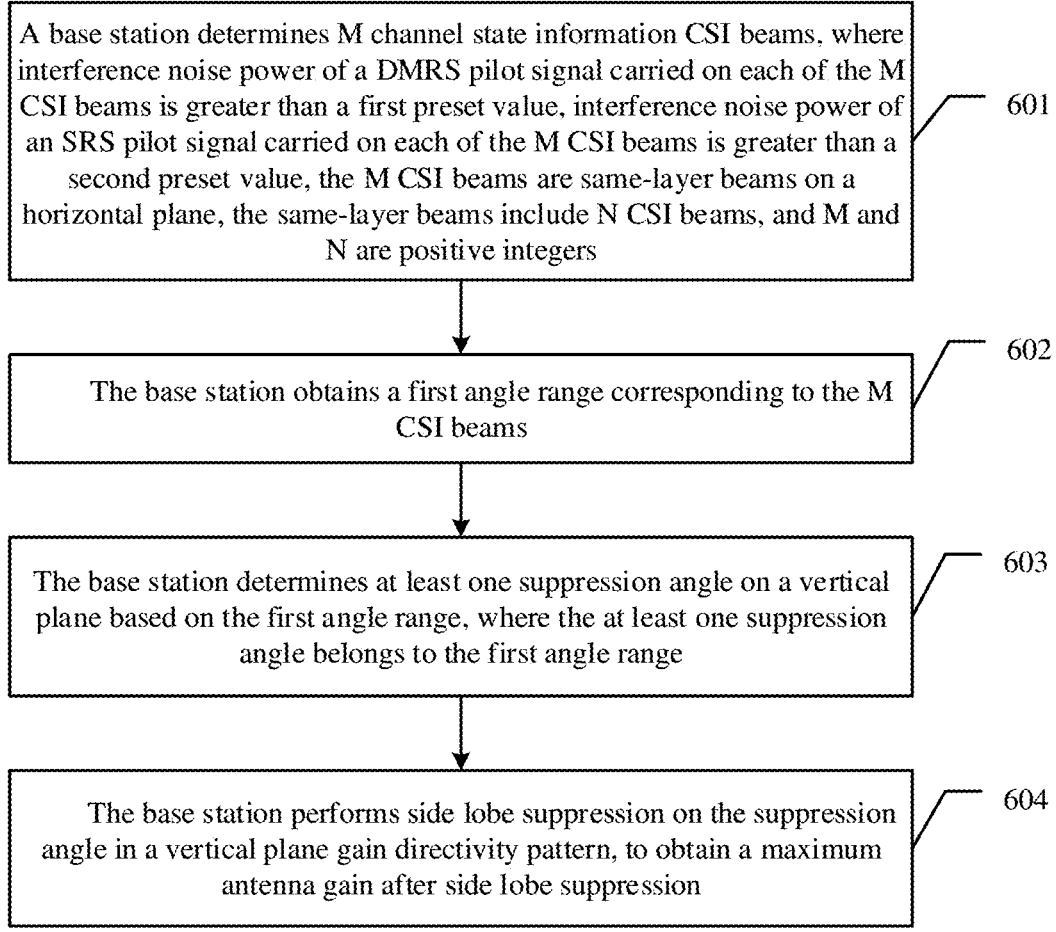
FIG. 6 is a schematic flowchart of another interference suppression method according to an embodiment of this application.

FIG. 6 is a schematic flowchart of another interference suppression method according to an embodiment of this application. The method includes the following steps.

601: A base station determines M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer.

For specific descriptions of step 601, refer to step 301 in the embodiment corresponding to FIG. 3. Details are not described herein again.

602: The base station obtains a first angle range corresponding to the M CSI beams.

For specific descriptions of step 602, refer to step 402 in the embodiment corresponding to FIG. 4. Details are not described herein again.

603: The base station determines at least one suppression angle on a vertical plane based on the first angle range, where the at least one suppression angle belongs to the first angle range.

In this embodiment of this application, after obtaining the first angle range corresponding to the M CSI beams, the base station equivalently knows an angle range of an interfered beam. Further, a terminal may determine the suppression angle based on the angle range, where there may be one or more suppression angles.

604: The base station performs side lobe suppression on the suppression angle in a vertical plane gain directivity pattern, to obtain a maximum antenna gain after side lobe suppression.

In an embodiment, the base station may determine an amplitude weight and a phase weight of an array element in each row and each column; determine a radiation field phase difference between two adjacent array element rows, a current excitation phase difference between two adjacent array element rows, a radiation field phase difference between two adjacent array element columns, and a current excitation phase difference between two adjacent array element columns; determine that a horizontal plane azimuth and a horizontal plane suppression angle in the maximum antenna gain are 0; and determine the maximum antenna gain based on the amplitude weight, the phase weight, the radiation field phase difference between two adjacent array element rows, the current excitation phase difference between two adjacent array element rows, the radiation field phase difference between two adjacent array element columns, and the current excitation phase difference between two adjacent array element columns.

The maximum antenna gain is expressed by using the following formula:

$$E(\theta, \varphi) = \sum_{m=0}^{Nx-1}\sum_{k=0}^{Ny-1} I(m,k)e^{j\gamma mk}e^{jk\left(\frac{2\pi}{\lambda}d_y(\sin\theta\cos\varphi - \sin\theta_0\cos\varphi_0)\right)}e^{jm\left(\frac{2\pi}{\lambda}d_x(\sin\theta\sin\varphi - \sin\theta_0\sin\varphi_0)\right)},$$

where $\theta$ is a vertical plane antenna tilt angle, $\varphi$ is the horizontal azimuth, $\theta_0$ is the suppression angle, $\varphi_0$ is the horizontal plane suppression angle, Nx is a quantity of array element rows, Ny is a quantity of array element columns, I(m,k) is an amplitude weight of an array element in an $m^{th}$ row and a $k^{th}$ column, and $e^{j\gamma mk}$ is a phase weight of the array element in the $m^{th}$ row and the $k^{th}$ column;

$$\frac{2\pi}{\lambda}d_x\sin\theta\sin\varphi$$

is the radiation field phase difference between two adjacent array element rows;

$$\frac{2\pi}{\lambda}d_x\sin\theta_0\sin\varphi_0$$

is the current excitation phase difference between two adjacent array element rows;

$$\frac{2\pi}{\lambda}d_x\sin\theta\cos\varphi$$

is the radiation field phase difference between two adjacent array element columns; and $$\frac{2\pi}{\lambda}d_x\sin\theta\cos\varphi$$

is the current excitation phase difference between two adjacent array element columns.

A weighting formula is reduced as follows by using the Euler formula:

$$E(\theta, \varphi) = \sum_{m=0}^{Nx-1}\sum_{k=0}^{Ny-1} I(m,k)e^{j\gamma mk}$$

$$\cos[(m-0.5)(\sin\theta\cos\varphi - \sin\theta_0\cos\varphi_0)]\cos[(k-0.5)(\sin\theta\sin\varphi - \sin\theta_0\sin\varphi_0)].$$

An objective of this embodiment is to perform vertical plane optimization. Therefore, the horizontal plane azimuth $\varphi$ and the horizontal plane suppression angle $\varphi_0$ are 0. In this case, the foregoing formula may be further simplified as follows:

$$E(\theta, 0) =$$

$$\sum_{m=0}^{Nx-1}\sum_{k=0}^{Ny-1} I(m,k)e^{j\gamma mk}\cos[(m-0.5)(\sin\theta - \sin\theta_0)]\cos[(k-0.5)(\sin\theta - \sin\theta_0)].$$

Next, this embodiment is explained by using an example.

If it is determined that a suppression angle is 325 degrees, Nx=4, and Ny=4 (to be specific, a horizontal plane and a vertical plane respectively have four rows and four columns of elements), for an original directivity pattern on the vertical plane, a quantity of rows needs to be fixed to 4, that is, m=4.

In this case, a new calculation formula after side lobe suppression is as follows:

$$E(\theta, 0) = \sum_{k=0}^{3} I(4, k)e^{j\gamma 4k}$$

$$\cos\left[(4-0.5)\left(\sin\theta - \sin\left(\frac{325}{180}*\pi\right)\right)\right]\cos\left[(k-0.5)\left(\sin\theta - \sin\left(\frac{325}{180}*\pi\right)\right)\right].$$

According to this embodiment, a gain may be suppressed by 7.5 dB at 325 degrees on the vertical plane.

In this embodiment of this application, if it is determined that the interference noise power of the DMRS pilot signal carried on each of the M CSI beams is not greater than the first preset value or the interference noise power of the SRS pilot signal carried on each of the M CSI beams is not greater than the second preset value, the side lobe suppression is not performed on the suppression angle in the vertical plane gain directivity pattern.

In a current technology, in a manner of manually adjusting a downtilt angle, an automatic rollback cannot be performed after interference disappears. In this embodiment of this application, an automatic rollback can be performed after interference disappears.

In this embodiment of this application, the base station determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, and M is the positive integer; the base station obtains the first angle range corresponding to the M CSI beams; the base station determines the at least one suppression angle on the vertical plane based on the first angle range, where the at least one suppression angle belongs to the first angle range; and the base station performs side lobe suppression on the at least one suppression angle in the vertical plane gain directivity pattern, to obtain the maximum antenna gain after side lobe suppression. In the foregoing manner, interference noise power of a pilot signal on a CSI beam is used to determine whether the CSI beam is an interfered beam, to implement beam-level interference detection, and implement beam-level upper side lobe suppression, so that atmospheric duct interference can be effectively reduced, and manual adjustment is not needed, thereby reducing onsite costs, and improving precision.

The following describes the technical solutions of this application from an apparatus side.

Figure 7:
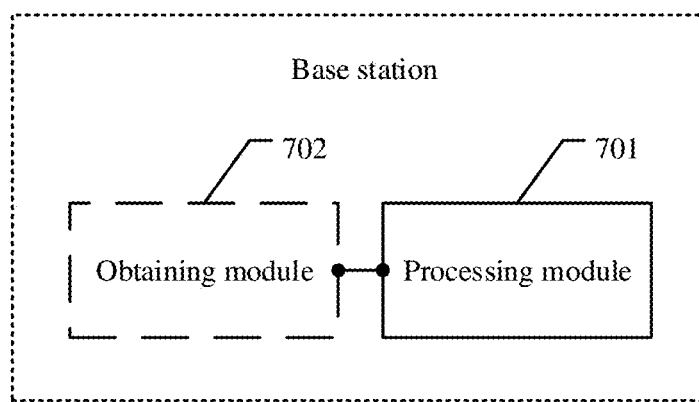
FIG. 7 is a schematic diagram of a structure of a base station according to an embodiment of this application.

FIG. 7 is a schematic diagram of a structure of a base station according to an embodiment of this application. The base station includes:

a processing module 701, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, the M CSI beams are same-layer beams on a horizontal plane, the same-layer beams include N CSI beams, and M and N are positive integers.

If a ratio of M to N is greater than a third preset value, the processing module 701 is further configured to skip scheduling and sending the N CSI beams included in the same-layer beams.

In another embodiment of this application, the base station further includes: an obtaining module 702, configured to obtain a first angle range corresponding to the M CSI beams, where the processing module 701 is further configured to determine at least one synchronization signal block SSB beam corresponding to the M CSI beams, where an intersection set between a second angle range corresponding to the at least one SSB beam and the first angle range is not an empty set; and if the ratio of M to N is greater than the third preset value, the processing module 701 is specifically configured to skip scheduling and sending the N CSI beams included in the same-layer beams and the at least one SSB beam.

In another embodiment of this application, the first angle range includes a first horizontal angle range and a first vertical angle range, and the second angle range includes a second horizontal angle range and a second vertical angle range; and the processing module 701 is specifically configured to determine the at least one synchronization signal block SSB beam corresponding to the M CSI beams, where an intersection set between the second horizontal angle range and the first horizontal angle range is not an empty set, and an intersection set between the second vertical angle range and the first vertical angle range is not an empty set.

In another embodiment of this application, the obtaining module 702 is further configured to obtain a first angle range corresponding to the M CSI beams; the processing module 701 is further configured to determine at least one phase tracking reference signal PTRS beam corresponding to the M CSI beams, where an intersection set between a third angle range corresponding to the at least one PTRS beam and the first angle range is not an empty set; and if the ratio of M to N is greater than the third preset value, the processing module 701 is specifically configured to skip scheduling and sending the N CSI beams included in the same-layer beams and the at least one PTRS beam.

In another embodiment of this application, the first angle range includes a first horizontal angle range and a first vertical angle range, and the third angle range includes a third horizontal angle range and a third vertical angle range; and the processing module 701 is specifically configured to determine the at least one PTRS beam corresponding to the M CSI beams, where an intersection set between the third horizontal angle range and the first horizontal angle range is not an empty set, and an intersection set between the third vertical angle range and the first vertical angle range is not an empty set.

In an optional embodiment, the processing module 701 is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, schedule and send the N CSI beams included in the same-layer beams.

In this embodiment of this application, the obtaining module 702 obtains the first angle range corresponding to the M CSI beams; the processing module 701 determines the at least one synchronization signal block SSB beam corresponding to the M CSI beams, where the intersection set of the second angle range corresponding to the at least one SSB beam and the first angle range is not the empty set; and if the ratio of M to N is greater than the third preset value, the processing module 701 skips scheduling and sending the N CSI beams included in the same-layer beams and the at least one SSB beam. In the foregoing manner, interference noise power of a pilot signal on a CSI beam is used to determine whether the CSI beam is an interfered beam, to implement beam-level interference detection, and implement beam-level interference suppression, so that atmospheric duct interference can be effectively reduced, and manual adjustment is not needed, thereby reducing onsite costs, and improving precision.

Figure 8:
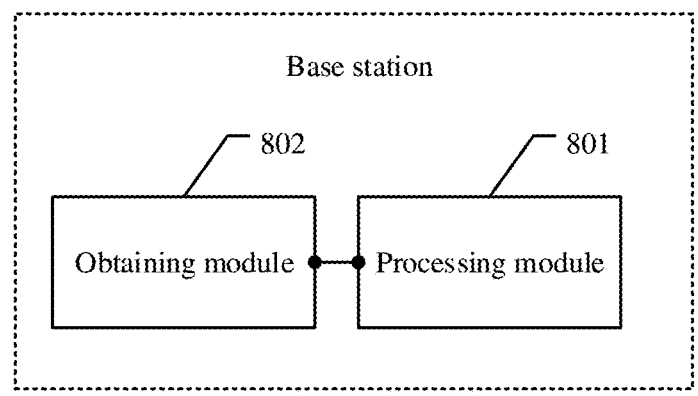
FIG. 8 is a schematic diagram of a structure of a base station according to an embodiment of this application.

FIG. 8 is a schematic diagram of a structure of a base station according to an embodiment of this application. The base station includes: a processing module 801, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; and an obtaining module 802, configured to obtain a first angle range corresponding to the M CSI beams.

The processing module 801 is further configured to: determine at least one null-steering angle based on the first angle range, where the at least one null-steering angle belongs to the first angle range; determine a directivity pattern gain and a suppression multiple that correspond to each null-steering angle in the at least one null-steering angle; and determine, based on the directivity pattern gain and the suppression multiple that correspond to each null-steering angle, a cancellation directivity pattern gain corresponding to each null-steering angle, where a sum of the cancellation directivity pattern gain and a product of the directivity pattern gain and the suppression multiple is zero.

In another embodiment of this application, the processing module 801 is specifically configured to determine a directivity pattern gain and a suppression multiple Z that correspond to each null-steering angle in the at least one null-steering angle, where the directivity pattern gain corresponding to each null-steering angle is calculated by using the following formula:

$$\sum_{n=0}^{X-1} a_n e^{j2\pi n \frac{d}{\lambda} \sin\varphi},$$

where X is a quantity of transceiver units, $a_n$ is a basic weight, d is an element spacing, $\lambda$ is a wavelength, and $\varphi$ is a horizontal plane null-steering angle.

In another embodiment of this application, the processing module 801 is specifically configured to determine, based on the directivity pattern gain and the suppression multiple Z that correspond to each null-steering angle, by using the following formula, the cancellation directivity pattern gain corresponding to each null-steering angle:

$$-Z * \sum_{n=0}^{X-1} a_n e^{j2\pi n \frac{d}{\lambda} \sin\varphi}.$$

In another embodiment of this application, the processing module 801 is specifically configured to determine a first directivity pattern gain matrix A and the suppression multiple Z that correspond to the at least one null-steering angle, where the first directivity pattern gain matrix A is specifically:

$$A = \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \ldots, \sum_{n=0}^{X-1} a_n e^{j2\pi n \frac{d}{\lambda} \sin\varphi_Y} \right]^T,$$

where X is the quantity of transceiver units, $a_n$ is the basic weight, d is the element spacing, $\lambda$ is the wavelength, $\varphi$ is the horizontal plane null-steering angle, and Y is a quantity of null-steering angles.

In another embodiment of this application, the processing module 801 is specifically configured to: determine a cancellation directivity pattern weight matrix P based on the first directivity pattern gain matrix A, a second directivity pattern gain matrix B, and the suppression multiple Z, where the second directivity pattern gain matrix B is the following matrix:

$$B = \begin{bmatrix} e^{j2\pi 0 \frac{d}{\lambda} \sin\varphi_1}, \ldots, e^{j2\pi(X-1)\frac{d}{\lambda}\sin\varphi_1} \\ \vdots \\ e^{j2\pi 0 \frac{d}{\lambda} \sin\varphi_Y}, \ldots, e^{j2\pi(X-1)\frac{d}{\lambda}\sin\varphi_Y} \end{bmatrix}$$

and the cancellation directivity pattern weight matrix P is the following matrix:

$P = B^H(BB^H)^{-1}A$; and determine the cancellation directivity pattern gain based on the cancellation directivity pattern weight matrix P.

In an optional embodiment, the processing module 801 is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, skip suppressing the directivity pattern gain corresponding to each null-steering angle.

In this embodiment of this application, the processing module 801 determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, and M is the positive integer; the obtaining module 802 obtains the first angle range corresponding to the M CSI beams; and the processing module 801 determines the at least one null-steering angle based on the first angle range, where the at least one null-steering angle belongs to the first angle range; determines the directivity pattern gain and the suppression multiple that correspond to each null-steering angle in the at least one null-steering angle; and determines, based on the directivity pattern gain and the suppression multiple that correspond to each null-steering angle, a cancellation directivity pattern gain corresponding to each null-steering angle, where a sum of the cancellation directivity pattern gain and a product of the directivity pattern gain and the suppression multiple is zero. In the foregoing manner, interference noise power of a pilot signal on a CSI beam is used to determine whether the CSI beam is an interfered beam, to implement beam-level interference detection, and implement beam-level interference suppression, so that atmospheric duct interference can be effectively reduced, and manual adjustment is not needed, thereby reducing onsite costs, and improving precision.

Figure 9:
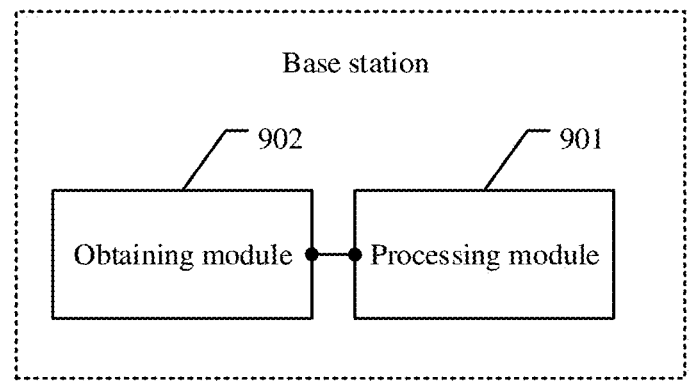
FIG. 9 is a schematic diagram of a structure of a base station according to an embodiment of this application.

FIG. 9 is a schematic diagram of a structure of a base station according to an embodiment of this application. The base station includes: a processing module 901, configured to determine M channel state information CSI beams, where interference noise power of a DMRS pilot signal carried on each of the M CSI beams is greater than a first preset value, interference noise power of an SRS pilot signal carried on each of the M CSI beams is greater than a second preset value, and M is a positive integer; and an obtaining module 902, configured to obtain a first angle range corresponding to the M CSI beams.

The processing module 901 is further configured to: determine at least one suppression angle on a vertical plane based on the first angle range, where the at least one suppression angle belongs to the first angle range; and perform side lobe suppression on the at least one suppression angle in a vertical plane gain directivity pattern, to obtain a maximum antenna gain after side lobe suppression.

In another embodiment of this application, the processing module 901 is specifically configured to: determine an amplitude weight and a phase weight of an array element in each row and each column; determine a radiation field phase difference between two adjacent array element rows, a current excitation phase difference between two adjacent array element rows, a radiation field phase difference between two adjacent array element columns, and a current excitation phase difference between two adjacent array element columns; determine that a horizontal plane azimuth and a horizontal plane suppression angle in the maximum antenna gain are 0; and determine the maximum antenna gain based on the amplitude weight, the phase weight, the radiation field phase difference between two adjacent array element rows, the current excitation phase difference between two adjacent array element rows, the radiation field phase difference between two adjacent array element columns, and the current excitation phase difference between two adjacent array element columns.

In another embodiment of this application, the maximum antenna gain is expressed by using the following formula:

$$E(\theta, \varphi) = \sum_{m=0}^{N_x-1} \sum_{k=0}^{N_y-1} I(m,k) e^{j\gamma mk} e^{jk\left(\frac{2\pi}{\lambda} d_y (\sin\theta\cos\varphi - \sin\theta_0\cos\varphi_0)\right)} e^{jm\left(\frac{2\pi}{\lambda} d_x (\sin\theta\sin\varphi - \sin\theta_0\sin\varphi_0)\right)},$$

where $\theta$ is a vertical plane antenna tilt angle, $\varphi$ is the horizontal azimuth, $\theta_0$ is the suppression angle, $\varphi_0$ is the horizontal plane suppression angle, Nx is a quantity of array element rows, Ny is a quantity of array element columns, I(m,k) is an amplitude weight of an array element in an $m^{th}$ row and a $k^{th}$ column, and $e^{j\gamma mk}$ is a phase weight of the array element in the $m^{th}$ row and the $k^{th}$ column;

$$\frac{2\pi}{\lambda} d_x \sin\theta \sin\varphi$$

is the radiation field phase difference between two adjacent array element rows;

$$\frac{2\pi}{\lambda} d_x \sin\theta_0 \sin\varphi_0$$

is the current excitation phase difference between two adjacent array element rows;

$$\frac{2\pi}{\lambda} d_x \sin\theta \cos\varphi$$

is the radiation field phase difference between two adjacent array element columns; and $$\frac{2\pi}{\lambda} d_x \sin\theta \cos\varphi$$

is the current excitation phase difference between two adjacent array element columns.

In an optional embodiment, the processing module 901 is further configured to: if it is determined that the interference noise power of the DMRS pilot signal carried on each of the M CSI beams is not greater than the first preset value or the interference noise power of the SRS pilot signal carried on each of the M CSI beams is not greater than the second preset value, skip performing side lobe suppression on the suppression angle in a vertical plane gain directivity pattern.

In this embodiment of this application, the processing module 901 determines the M channel state information CSI beams, where the interference noise power of the DMRS pilot signal carried on each of the M CSI beams is greater than the first preset value, the interference noise power of the SRS pilot signal carried on each of the M CSI beams is greater than the second preset value, and M is the positive integer; the obtaining module 902 obtains the first angle range corresponding to the M CSI beams; and the processing module 901 determines the at least one suppression angle on the vertical plane based on the first angle range, where the at least one suppression angle belongs to the first angle range; and performs side lobe suppression on the at least one suppression angle in the vertical plane gain directivity pattern, to obtain the maximum antenna gain after side lobe suppression. In the foregoing manner, interference noise power of a pilot signal on a CSI beam is used to determine whether the CSI beam is an interfered beam, to implement beam-level interference detection, and implement beam-level upper side lobe suppression, so that atmospheric duct interference can be effectively reduced, and manual adjustment is not needed, thereby reducing onsite costs, and improving precision.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

It may be clearly understood by persons skilled in the art that, for convenient and brief description, for a detailed working process of a system, an apparatus, and a unit that are described above, refer to a corresponding process in the foregoing method embodiments. Details are not described herein again.

In the several embodiments provided in this application, it should be understood that a disclosed system, apparatus, and method may be implemented in another manner. For example, an apparatus embodiment described above is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to a current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
in response to determining M channel state information (CSI) beams for which interference noise power of a demodulation reference signal (DMRS) pilot signal carried on each of the M CSI beams is greater than a first preset value and interference noise power of a sounding reference signal (SRS) pilot signal carried on each of the M CSI beams is greater than a second preset value, performing the following:
obtaining a first angle range corresponding to the M CSI beams, wherein M is a positive integer;
determining at least one null-steering angle based on the first angle range, wherein the at least one null-steering angle belongs to the first angle range;
determining a directivity pattern gain and a suppression multiple that correspond to each null-steering angle in the at least one null-steering angle, wherein each suppression multiple is a ratio of a suppression amount to the corresponding directivity pattern gain; and
determining, for each null-steering angle based on the directivity pattern gain and the suppression multiple that correspond to the each null-steering angle, a cancellation directivity pattern gain corresponding to the each null-steering angle, wherein for the each null steering angle a sum of the cancellation directivity pattern gain and a product of the directivity pattern gain and the suppression multiple corresponding to the each null steering angle is zero.

2. The method according to claim 1, wherein obtaining the first angle range corresponding to the M CSI beams comprises:
obtaining M beam IDs corresponding to the M CSI beams; and
determining, based on a correspondence between one or more beam IDs and one or more angle ranges, a first angle range corresponding to each beam ID of the M beam IDs.

3. The method according to claim 1, wherein determining the directivity pattern gain and the suppression multiple that correspond to each null-steering angle in the at least one null-steering angle comprises:
determining the directivity pattern gain and the suppression multiple that correspond to each null-steering angle in the at least one null-steering angle, wherein the directivity pattern gain corresponding to each null-steering angle is calculated using the following formula:

$$\sum_{n=0}^{X-1} a_n e^{j2\pi n \frac{d}{\lambda}\sin\varphi},$$

wherein X is a quantity of transceivers, $a_n$ is a basic weight, d is an element spacing, $\lambda$ is a wavelength, and $\varphi$ is a horizontal plane null-steering angle.

4. The method according to claim 3, wherein determining, for each null-steering angle based on the directivity pattern gain and the suppression multiple that correspond to the each null-steering angle, the cancellation directivity pattern gain corresponding to the each null-steering angle, comprises:
determining, for each null-steering angle based on the directivity pattern gain and the suppression multiple that correspond to the each null-steering angle, and using the following formula, the cancellation directivity pattern gain corresponding to the each null-steering angle:

$$-Z * \sum_{n=0}^{X-1} a_n e^{j2\pi n \frac{d}{\lambda} \sin\varphi};$$

and wherein Z is the suppression multiple that corresponds to the each null-steering angle.

5. The method according to claim 3, wherein determining the directivity pattern gain and the suppression multiple that correspond to the each null-steering angle in the at least one null-steering angle comprises:

determining a first directivity pattern gain matrix A and the suppression multiple that correspond to the each null-steering angle in the at least one null-steering angle, wherein the first directivity pattern gain matrix A is:

$$A = -Z * \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \ldots, \sum_{n=0}^{X-1} a_n e^{j2\pi n \frac{d}{\lambda} \sin\varphi_Y} \right]^T,$$

wherein X is the quantity of transceivers, $a_n$ is the basic weight, d is the element spacing, $\lambda$ is the wavelength, $\varphi$ is the horizontal plane null-steering angle, Y is a quantity of null-steering angles in the at least one null-steering angle, and Z is the suppression multiple that corresponds to the each null-steering angle.

6. The method according to claim 5, wherein determining, for each null-steering angle based on the directivity pattern gain and the suppression multiple that correspond to the each null-steering angle, the cancellation directivity pattern gain corresponding to the each null-steering angle comprises:

for the each null-steering angle, determining a cancellation directivity pattern weight matrix P based on the first directivity pattern gain matrix A, a second directivity pattern gain matrix B, and the suppression multiple corresponding to the each null-steering angle; and determining the cancellation directivity pattern gain corresponding to the each null-steering angle based on the cancellation directivity pattern weight matrix P;

wherein the second directivity pattern gain matrix B is the following matrix:

$$B = \begin{bmatrix} e^{j2\pi 0 \frac{d}{\lambda} \sin\varphi_1}, \ldots, e^{j2\pi(X-1)\frac{d}{\lambda} \sin\varphi_1} \\ \vdots \\ e^{j2\pi 0 \frac{d}{\lambda} \sin\varphi_Y}, \ldots, e^{j2\pi(X-1)\frac{d}{\lambda} \sin\varphi_Y} \end{bmatrix};$$

and wherein the cancellation directivity pattern weight matrix P is the following matrix:

$P = B^H(BB^H)^{-1}A$.

7. The method according to claim 1, further comprising:

in response to determining that the interference noise power of the DMRS pilot signal carried on each of the M CSI beams is not greater than the first preset value or the interference noise power of the SRS pilot signal carried on each of the M CSI beams is not greater than the second preset value, skipping suppressing the directivity pattern gain corresponding to the each null-steering angle.

8. An apparatus, comprising:

at least one processor; and a non-transitory memory coupled to the at least one processor, the at least one processor being configured to:

in response to determining M channel state information CSI beams for which interference noise power of a demodulation reference signal (DMRS) pilot signal carried on each of the M CSI beams is greater than a first preset value and interference noise power of an sounding reference signal (SRS) pilot signal carried on each of the M CSI beams is greater than a second preset value, performing the following:

obtain a first angle range corresponding to the M CSI beams, wherein M is a positive integer;

determine at least one null-steering angle based on the first angle range, wherein the at least one null-steering angle belongs to the first angle range;

determine a directivity pattern gain and a suppression multiple that correspond to each null-steering angle in the at least one null-steering angle, wherein each suppression multiple is a ratio of a suppression amount to the corresponding directivity pattern gain; and determine, based on the directivity pattern gain and the suppression multiple that correspond to the each null-steering angle, a cancellation directivity pattern gain corresponding to the each null-steering angle, wherein a sum of the cancellation directivity pattern gain and a product of the directivity pattern gain and the suppression multiple corresponding to the each null steering angle is zero.

9. The apparatus according to claim 8, wherein the processor being configured to obtain the first angle range corresponding to the M CSI beams comprises the processor being configured to:

obtain M beam IDs corresponding to the M CSI beams; and determine, based on a correspondence between one or more beam IDs and one or more angle ranges, a first angle range corresponding to each beam ID of the M beam IDs.

10. The apparatus according to claim 8, wherein the processor being configured to determine the directivity pattern gain and the suppression multiple that correspond to the each null-steering angle in the at least one null-steering angle comprises the processor being configured to:

determine a directivity pattern gain and a suppression multiple that correspond to each null-steering angle in the at least one null-steering angle, wherein the directivity pattern gain corresponding to the each null-steering angle is calculated by using the following formula:

$$\sum_{n=0}^{X-1} a_n e^{j2\pi n \frac{d}{\lambda} \sin\varphi},$$

wherein X is a quantity of transceivers, $a_n$ is a basic weight, d is an element spacing, $\lambda$ is a wavelength, and $\varphi$ is a horizontal plane null-steering angle.

11. The apparatus according to claim 10, wherein the processor being configured to determine, for each null-steering angle based on the directivity pattern gain and the suppression multiple that correspond to the each null-steering angle, the cancellation directivity pattern gain corresponding to the each null-steering angle, comprises the processor being configured to:

determine, for each null-steering angle based on the directivity pattern gain and the suppression multiple that correspond to the each null-steering angle, using the following formula, the cancellation directivity pattern gain corresponding to the each null-steering angle:

$$-Z * \sum_{n=0}^{X-1} a_n e^{j2\pi n \frac{d}{\lambda} \sin\varphi};$$

and wherein Z is the suppression multiple corresponding to the each null-steering angle.

12. The apparatus according to claim 10, wherein the processor being configured to determine the directivity pattern gain and the suppression multiple that correspond to the each null-steering angle in the at least one null-steering angle comprises the processor being configured to:

determine a first directivity pattern gain matrix A and the suppression multiple that correspond to each null-steering angle in the at least one null-steering angle, wherein the first directivity pattern gain matrix A is:

$$A = -Z * \left[ \sum_{n=0}^{X-1} a_n e^{j2\pi n \frac{d}{\lambda} \sin\varphi_1}, \sum_{n=0}^{X-1} a_n e^{j2\pi n \frac{d}{\lambda} \sin\varphi_2}, \dots, \sum_{n=0}^{X-1} a_n e^{j2\pi n \frac{d}{\lambda} \sin\varphi_Y} \right]^T,$$

wherein X is the quantity of transceivers, $a_n$ is the basic weight, d is the element spacing, $\lambda$ is the wavelength, $\varphi$ is the horizontal plane null-steering angle, Y is a quantity of null-steering angles in the at least one null-steering angle, and Z is the suppression multiple that corresponds to the each null-steering angle.

13. The apparatus according to claim 12, wherein the processor being configured to determine, for each null-steering angle based on the directivity pattern gain and the suppression multiple that correspond to the each null-steering angle, the cancellation directivity pattern gain corresponding to the each null-steering angle comprises the processor being configured to:

for the each null-steering angle, determine a cancellation directivity pattern weight matrix P based on the first directivity pattern gain matrix A, a second directivity pattern gain matrix B, and the suppression multiple corresponding to the each null-steering angle; and determine the cancellation directivity pattern gain based on the cancellation directivity pattern weight matrix P;

wherein the second directivity pattern gain matrix B is the following matrix:

$$B = \begin{bmatrix} e^{j2\pi 0 \frac{d}{\lambda} \sin\varphi_1}, \dots, e^{j2\pi(X-1)\frac{d}{\lambda}\sin\varphi_1} \\ \vdots \\ e^{j2\pi 0 \frac{d}{\lambda} \sin\varphi_Y}, \dots, e^{j2\pi(X-1)\frac{d}{\lambda}\sin\varphi_Y} \end{bmatrix};$$

and wherein the cancellation directivity pattern weight matrix P is the following matrix:

$$P = B^H (BB^H)^{-1} A.$$

14. The apparatus according to claim 8, wherein the processor is further configured to:

in response to determining that the interference noise power of the DMRS pilot signal carried on each of the M CSI beams is not greater than the first preset value or the interference noise power of the SRS pilot signal carried on each of the M CSI beams is not greater than the second preset value, skip suppressing the directivity pattern gain corresponding to each null-steering angle.

15. A method, comprising:

determining M channel state information CSI beams, wherein interference noise power of a demodulation reference signal (DMRS) pilot signal carried on each of the M CSI beams is greater than a first preset value, interference noise power of a sounding reference signal (SRS) pilot signal carried on each of the M CSI beams is greater than a second preset value, and M is a positive integer;

obtaining a first angle range corresponding to the M CSI beams;

determining at least one null-steering angle based on the first angle range, wherein the at least one null-steering angle belongs to the first angle range;

determining a vertical plane suppression angle corresponding to each null-steering angle of the at least one null-steering angle; and performing side lobe suppression on the vertical plane suppression angle corresponding to each null-steering angle in a vertical plane gain directivity pattern, to obtain a maximum antenna gain after side lobe suppression.

16. The method according to claim 15, wherein performing side lobe suppression on the vertical plane suppression angle corresponding to each null-steering angle in the vertical plane gain directivity pattern, to obtain the maximum antenna gain after side lobe suppression, comprises:

determining an amplitude weight and a phase weight of an array element in each row and each column of an array;

determining a radiation field phase difference between two adjacent array element rows, a current excitation phase difference between two adjacent array element rows, a radiation field phase difference between two adjacent array element columns, and a current excitation phase difference between two adjacent array element columns;

determining that a horizontal plane azimuth and a horizontal plane suppression angle in the maximum antenna gain are o; and determining the maximum antenna gain based on the amplitude weight, the phase weight, the radiation field phase difference between two adjacent array element rows, the current excitation phase difference between two adjacent array element rows, the radiation field phase difference between two adjacent array element columns, and the current excitation phase difference between two adjacent array element columns.

17. The method according to claim 16, wherein the maximum antenna gain is expressed using the following formula:

$$E(\theta, \varphi) = \sum_{m=0}^{N_x-1} \sum_{k=0}^{N_y-1} I(m, k) e^{j\gamma mk} e^{jk\left(\frac{2\pi}{\lambda} d_y\left(\sin\theta\cos\varphi - \sin\theta_0\cos\varphi_0\right)\right)} e^{jm\left(\frac{2\pi}{\lambda} d_x\left(\sin\theta\sin\varphi - \sin\theta_0\sin\varphi_0\right)\right)},$$

wherein $\theta$ is a vertical plane antenna tilt angle, $\varphi$ is the horizontal azimuth, $\theta_0$ is the suppression angle, $\varphi_0$ is the horizontal plane suppression angle, Nx is a quantity of array element rows, Ny is a quantity of array element columns, I(m, k) is an amplitude weight of an array element in an $m^{th}$ row and a $k^{th}$ column, and $e^{j\gamma mk}$ is a phase weight of the array element in the $m^{th}$ row and the $k^{th}$ column;

$$\frac{2\pi}{\lambda} d_x \sin\theta\cos\varphi$$

is the radiation field phase difference between two adjacent array element rows;

$$\frac{2\pi}{\lambda} d_x \sin\theta_0 \sin\varphi_0$$

is the current excitation phase difference between two adjacent array element rows;

$$\frac{2\pi}{\lambda} d_x \sin\theta\cos\varphi$$

is the radiation field phase difference between two adjacent array element columns; and $$\frac{2\pi}{\lambda} d_x \sin\theta\cos\varphi$$

is the current excitation phase difference between two adjacent array element columns.

* * * * *

UNITED STATES PATENT AND TRADEMARK OFFICE
CERTIFICATE OF CORRECTION

PATENT NO. : 11,956,045 B2
APPLICATION NO. : 17/455527
DATED : April 9, 2024
INVENTOR(S) : Yang et al.

It is certified that error appears in the above-identified patent and that said Letters Patent is hereby corrected as shown below:

In the Claims

In Column 33, in Claim 17, Line 21, delete "$\frac{2\pi}{\lambda}d_x\sin\theta\cos\varphi$," and insert -- $\frac{2\pi}{\lambda}d_x\sin\theta\sin\varphi$ --.

Signed and Sealed this
Twenty-first Day of May, 2024

Katherine Kelly Vidal
*Director of the United States Patent and Trademark Office*